United States Patent Office 3,362,830
Patented Jan. 9, 1968

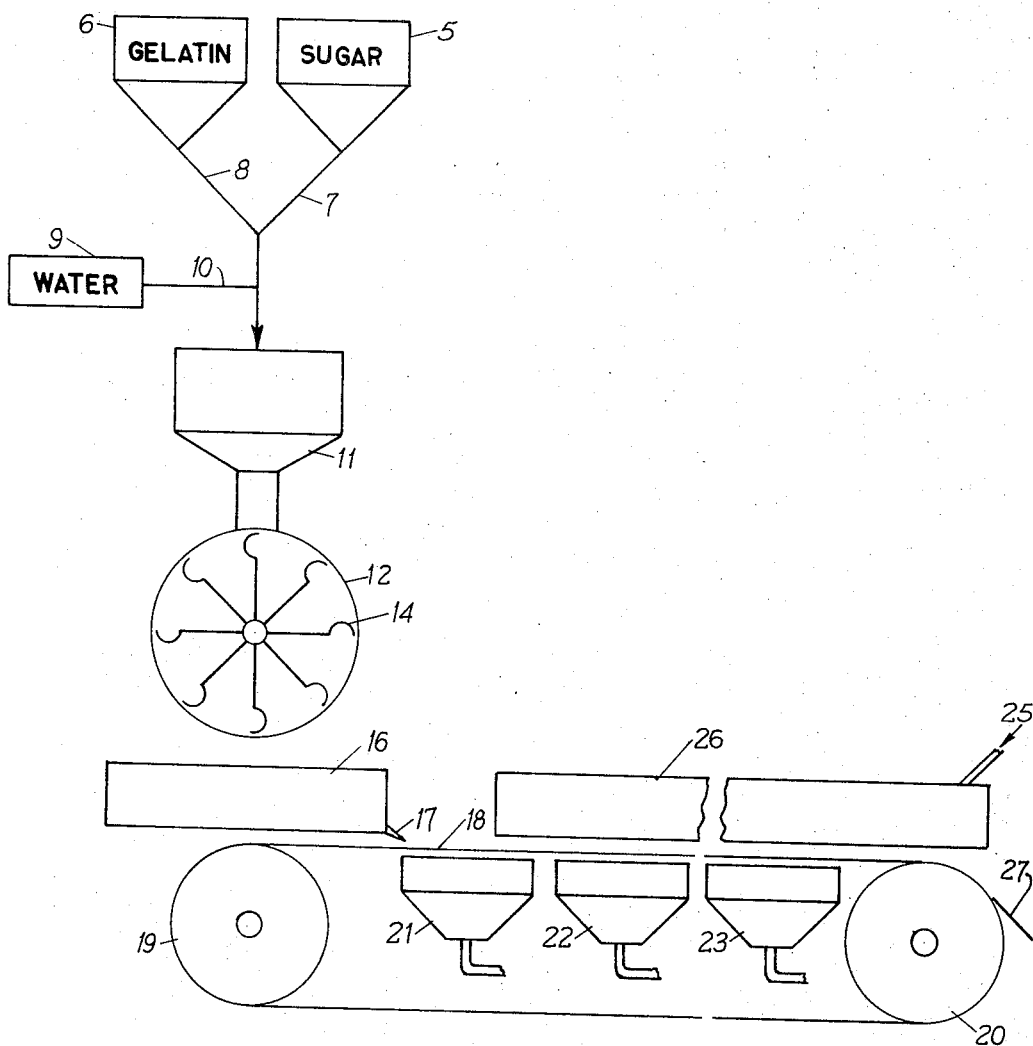

3,362,830
PREPARATION OF WATER SOLUBLE PRODUCT
Ralph J. Addesso, Norwalk, Conn., assignor to American Machine & Foundry Company, a corporation of New Jersey
Filed Apr. 4, 1966, Ser. No. 540,000
6 Claims. (Cl. 99—130)

This invention relates to a gelatin product which is soluble in cold water. More particularly it relates to gelatin-sugar powders which are readily completely soluble in cold water and are especially suitable for preparing gelatin desserts. The product of the invention is prepared by dissolving sugar and gelatin in water in at least a 7:1 ratio, foaming the solution to a desirable density, casting the foam as a continuous layer, drying the layer and removing it from the drying surface.

Although a number of methods of preparing cold water-soluble gelatin have been described in the prior art, such as those methods disclosed, for example, in U.S. Patents 1,735,356, 2,166,074, 2,803,548, 2,819,970, 2,819,971, 2,834,683, 2,841,498, and 2,949,622, yet, apart from the product prepared by the present invention, no gelatin product is known which dissolves rapidly and completely in cold water.

Drawbacks in techniques heretofore proposed for producing a gelatin which is soluble in cold water include among others, for example; substantially incomplete solubility in cold water; an inferior or damaged product resulting from exposure to severe conditions during preparation or on drying; cumbersome and/or costly and/or complex processing equipment or steps.

The present invention, by an inexpensive and practical method, produces a distinctly novel product which has the property of being rendered rapidly, i.e., practically instantly, and completely soluble in cold water.

At the present time gelatin desserts available commercially must be dissolved in boiling water before the product exhibits its functional characteristics. This conventional preparation which requires hot water is of course, time consuming, not only because the water must be heated, but also because the hot solution requires several hours of cooling to allow the gel to form, i.e., before the dessert is ready for consumption. In addition to the inconvenience involved in the necessary use of hot water, hot water is also a hazard especially to children. A child is therefore, naturally discouraged from making this dessert. For these reasons, and others, the availability of a cold water soluble gelatin powder is exceedingly desirable.

It has been found that gelatin-containing powders which are truly cold water-soluble can be produced by a rapid, inexpensive, and easily reproducible method invention involving essentially the foaming and dehydration of gelatin-sugar solutions of certain compositions and under controlled conditions.

It is accordingly an object of the invention to provide a cold-water soluble gelatin.

It is a more specific object of the invention to provide a simple and relatively inexpensive readily reproducible gelatin dehydration method whereby a gelatin-sugar solution is foamed and dried to make a powdered cold-water soluble product.

It is a distinct object of the invention to provide a sugar-gelatin dessert which is characterized especially by its unique property of being completely soluble in water of room temperature and even lower.

Various additional objects of the invention will become apparent from the description which follows:

Summarized briefly, the technique used to obtain the distinctly advantageous product of the invention comprises dissolving a mixture of sugar and gelatin in weight ratios of at least 7:1 and higher in approximately equal amount of water; the water being sufficiently heated to completely dissolve the solids. Thereafter, this solution, at moderate temperature, is foamed to a density of less than about 0.6 gram/cc. This foam density should be kept below about 0.6 gram/cc., and the optimum is about 0.2 to about 0.3 gram/cc. The foam is then cast on an impervious metal drying belt having a belt surface temperature of between about 70–140° F. and, preferably at a temperature of about 90° F. to about 100° F. and dried to suitable moisture content. Generally, moisture contents of below about 3% in the dried product are desired. Drying is preferably effected by passing the belt having the foamed sugar-gelatin solution thereon through a drying chamber wherein it is exposed to heat for only relatively brief periods, i.e., less than five minutes and preferably for a period not exceeding about two minutes. The relatively brief drying chamber retention times are possible because of the thin layers of less than 150 mils of the foam solution which are cast, more generally foam layers of less than 75 mils and preferably about 20 to 30 mils are used. The brief exposure to heat, i.e., dryer residence time, is believed to be responsible for preservation of the significantly distinct cold water solubility of the product and for the excellent strength of resulting dessert gel obtained from dissolving the dried product. The resulting dried material is then doctored off the belt at temperatures below 130° F.

The invention will be further described in conjunction with the accompanying drawing which schematically depicts the various steps employed in the process.

As shown in the drawing, sugar and gelatin from an appropriate source 5 and 6 in suitable concentrations; i.e., in weight ratios of at least 7:1 and preferably about 9:1 respectively, are introduced into a mixing vessel 11 through lines 7 and 8, respectively. Water 9 through a line 10 is added in amounts approximately equal to the weight of the gelatin-sugar mixture. The solution from vessel 11 is then fed into an appropriate foam generating apparatus 12, where air or other suitable gas is incorporated such as by beating it into the liquid mix by means of a conventional beater or whipping mechanism 14 until a substantially rigid and stable foam of desired density below about 0.6 g./cc. is produced. The foam prepared in this, or other suitable manner is fed continuously onto a drying surface, e.g., belt 18 from a casting device 16. The casting temperature should not exceed 140° F. preferably it is about 90°–100° F. The casting mechanism is equipped with a foam layer thickness gauge 17, which deposits a foam layer below about 150 mils. Although preferred results are obtained with layer thickness not exceeding about 75 mils. The drying surface 18 preferably comprises an impervious belt of stainless steel which offers optimum control of application of heat at the underside of the belt. The belt 18 is appropriately supported at 19 and 20 and is driven in a conventional manner.

The foam layer is carried by the conveyor 18 through one or more drying stages. The belt 18 may be provided with a heating arrangement which comprises one or more steam boxes, three of which are shown as 21, 22, 23. The boxes are used to heat the underside of the belt at temperatures which are suitably regulated to prevent scorching of the relatively delicate foam. Heat regulation may be accomplished by separately controlling the heat input to each of the boxes 21, 22 and 23 and/or by admixing controlled amounts of air with the steam fed into these boxes. Drying of the product is further aided by the utilization of a hot air stream 25 passed over the product, as by a convenient hood or baffle arrangement 26. The drying times and temperatures are at least partly interdependent. In general drying temperatures should not exceed about 180° F. and drying times should not exceed about 5 minutes. Preferably drying temperatures should not exceed about 170° F., while drying residence times should preferably not exceed about 2–3 minutes. Dried product is removed from the belt by a suitable scraper or doctoring device 27. The product is preferably doctored from the belt at temperatures below about 130° F.

"Cold water solubility," as the term is herein employed to characterize the gelatin product, means a product which dissolves in water temperatures normally encountered with tap water; such temperatures may range generally from about 40° F. to about 80° F. However, the sugar-gelatin product of the invention is soluble in water of temperatures even below 40° F.

In summary it is seen that the invention resides essentially in the discovery that certain steps are critical in obtaining a completely cold-water soluble sugar-gelatin product. It is necessary that the gelatin solution be dried as a stable foam. It is necessary that the foam be dried rapidly and this requires thin layers. Loss of solubility when thick layers, or unstable foams, are employed is believed due to the relatively long exposure to heat, which is necessary to dehydrate thick foam layers or to dehydrate substantially unfoamed solution. Thus, long exposure to heat appears to alter the physical characteristics of gelatin as well as the desired foam structure. In any case, prolonged drying times results in retarded water solubility. In observing the effect of drying, it appears that relatively thick or unfoamed layers form a barrier to effective transfer of moisture from the foam layer. Thick layers require foam drying times which increase disproportionately to the increase in the thickness of the layer to be dried; and that requirement leads to alteration of the physical characteristics of the product. The longer drying times affect the structure of the product adversely to good cold water solubility. While layers in thickness of from 10 mils to about 120 mils and foam densities below 0.5 g./cc. may be employed in practicing the invention. It has been found that layers below about 75 mils and preferably between about 20 mils and about 30 mils and density of about 0.2–0.3 g./cc. offer the optimum operating conditions.

The presence of sugar with gelatin is important. Also, the two ingredients must co-exist in the solution which is foamed and dried; i.e., the drying of foam gelatin alone and subsequent blending of foam dried gelatin with sugar does not impart the advantageous cold water soluble characteristic to the blend. For preparing the sugar-gelatin solution, it has been found that when ratios of about 7:1 and less are used, the cold water solubility of the foam dried solution is very significantly adversely affected. While the cold water solubility of product dried from foam solutions having ratios above about 10:1 is not lost, the economics may be adversely affected because relatively greater quantities of the product would be needed to obtain a given gel strength. Furthermore, when used as the usual gelatin dessert, a product with sugar-gelatin ratios significantly higher than 11:1 may be undesirably sweet. The preferred proportions of sugar to gelatin in conventional gelatin dessert products are in the range of about 8–1 to 10–1; the optimum including consideration of taste quality is about 9:1.

While sucrose is the sugar normally employed, this does not preclude the use of other sugars which also may be suitable, examples of which are fructose, galactose, glucose, maltose, lactose, cane sugar, mannitol, sorbitol, mixtures thereof and the like.

The term "gelatin" is well known in the art and contemplates any edible commercially available gelatin; i.e., beef skin, pork skin, etc., of the kind used in dessert formulation. The form of the sugar or the gelatin used to prepare the solutions to be foamed and dried can be the dry type or it may be refined, concentrated liquors or extracts.

Foam density is preferably maintained below about 0.6 g./cc.; this density also is compatible with stable foam. No foam stabilizing agent is necessary or desired, although the use of a minor amount of known foam stabilizing agents in the method of the present invention is not precluded. Desirable products are obtained by foaming gelatin-sugar solutions to a density in the range of about 0.2 to about 0.5 g./cc., although foams having a density as low as 0.1 and up to about 0.6 g./cc. may be utilized. Also, while no disadvantages are noted with lower density foams other than they may present some difficulty in preparations, in the case of densities of 0.6 g./cc. and higher, some breakdown in foam structure may occur during drying and as a consequence may suffer at least partial loss of solubility.

It is important that the foam be cast at belt surface temperatures between about 70° F.–140° F. Casting temperatures below 70° F. may result in at least partial gelling of the foam so that good casting is obstructed and/or the product is adversely affected while temperatures above about 140° F. in the casting operation cause the foam structure to breakdown resulting in a product whose cold water solubility is damaged. The product, when exposed to higher temperatures, for example, 180° F., should not be so exposed for more than 5 minutes, and preferably for periods not exceeding 2–3 minutes; otherwise the cold water solubility is impaired and/or the product gel strength suffers. The doctoring temperatures should also be below 130° F. to eliminate fusing and structural damage to the product and concomitant loss of cold water solubility.

The following examples are given for the purpose of illustrating the invention. However, it will be understood that the invention should not be limited to the specific conditions recited therein.

EXAMPLE I

Five pounds of a gelatin-sugar mixture in the ratio of 1 to 9 were completely dissolved in 5 lbs. of boiling water. Using a Hobart mixer with wire whip, the mixture was whipped at high speed for 8 minutes to a stable foam density of 0.25 gram/cc. The resulting foam at a temperature of 110° F. was continuously applied to a moving drying surface comprising a continuous metal belt provided with underbelt heat from steam condensation and overbelt heated air. The wet foam was cast at a thickness of 20 mils. The belt speed was set at 10 feet per minute going through the 15-foot dryer. The heating program was such that temperatures of product was not permitted to exceed 170° F. The product was doctored from the belt at 90° F. in a "Dry" room (75° F.—10% RH) after passing through a cooling chamber. A white, finely divided flake form was obtained with a moisture content of 1.5%. Gel strength (Bloom) and viscosity of the subsequently dissolved material were essentially the same as those obtained from the gel prepared from the starting material. The foam dried product had instant cold water solubility as determined by the static and dynamic solubility tests. These tests are described hereinafter. This product is also compared in Table I.

EXAMPLE II

Ten parts of a sugar-gelatin mixture in the ratio of 9 parts of sugar to 1 part of gelatin were dissolved in ten parts of water by heating the water and stirring. The solution was vacuum dried at 50 to 100 mm. Hg pressure allowing the temperature to rise to 70° C. The product is not cold water soluble. The comparative solubility of this product is set forth in Table I.

EXAMPLE III

One part of dry commercial gelatin is mixed with nine parts granulated cane sugar, and ten parts water are added to the mixture. The suspension was heated until a homogeneous solution resulted. The resulting mixture was smeared on a glass slide as a film of about 0.004 cm. thickness and dried in an oven at about 100° C. The drying took about three minutes. The dry material was scraped off the slide and pulverized. The product does not dissolve in cold water. Results of cold water solubility test for this product are presented in Table I.

EXAMPLE IV

An ungelled warm fluid solution of gelatin dessert ingredients of 50% solids content, containing about 8.8 parts of sucrose, 0.175 part citric acid, 1 part gelatin of 225 Bloom strength, and 10 parts of water was distributed uniformly on a flat glass plate so as to have a thickness of about 0.026 cm., and was dried at about 100° C. for 7 minutes. The resulting dried brittle material was scraped off the plate and stirred in cold water. It does not dissolve. Comparative solubility is set forth in Table I.

EXAMPLES V AND VI

Ten parts of gelatin were dissolved in 90 parts of hot water, foamed to the density of 0.25 gram/cc. and dried in accordance with the procedure of Example I. The sugar was omitted. This product without sugar (Example V) was tested for cold water solubility. A second sample of the foam dehydrated gelatin without sugar (Example VI) was after drying admixed with dry sugar in a ratio of 9 parts of sucrose to one part of the foam dried gelatin. Neither was cold water soluble. The results of each are compared in Table I.

Each of the above gelatin products was tested for cold water solubility by both static and dynamic solubility methods, which are defined hereinbelow, and compared to the product made according to this invention. Included in the comparison of Table I as Example VII are also three well-known commercial gelatin dessert powders, A, B, and C, obtained on the open market. Each contains gelatin and sugar in the approximate ratio of 1:9.

*Static solubility test*

This test is intended to approximate the procedure followed by a housewife in preparing a gelatin dessert; it is carried out as follows:

The sample (to form a 2% solution based on gelatin) is added to a beaker containing 50 cc. of water at 60° F. The mixture is stirred by hand using a teaspoon (approximately 2 turns per second) until essentially all the material goes into solution at which point the elapsed time is recorded. As a practical limit, times are terminated at 10 minutes.

*Dynamic solubility test*

This test is more accurate than the static test and will show smaller differences between various materials.

A sample (to form a 1% solution based on gelatin) is added to a 250 cc. beaker containing 100 cc. of water at 60° F. The beaker is placed on a regulated heat source, e.g., a hot plate, and the heat input carefully controlled so that the temperature of the water rises at a controlled rate from 60° F. to 110° F. in exactly 8 minutes under constant and controlled stirring. The lowest temperature at which all material is completely dissolved is recorded as the solution temperature for the particular product being tested.

TABLE I.—RELATIVE COLD WATER SOLUBILITIES OF THE VARIOUS GELATIN PRODUCTS

| Example | Product | Static Method, 60° Water Solution Time | Dynamic Method, Temp. of Solubility, °F. |
|---|---|---|---|
| I | Foamed, dried 9:1 sugar-gelatin mixture. | 45 sec | 66 |
| II | Vacuum dired 9:1 sugar-gelatin. | >10 min | 95 |
| III | Thin film drying 9:1 sugar-gelatin. | >10 min | 88 |
| IV | Unfoamed film (10 mil) drying 9:1 sugar-gelatin. | >10 min | 90 |
| V | Gelatin dried as foam without sugar. | >10 min | 95 |
| VI | Gelatin foam dried without sugar and mixed with dry sugar in 9:1 ratio. | >10 min | 94 |
| VII | Commercial gelatin: | | |
| | A | >10 min | 95 |
| | B | >10 min | 95 |
| | C | >10 min | 95 |

It can readily be seen by reference to Table I, that by either test the cold water solubility of the foam dried 9:1 sugar-gelatin was overwhelming superior to all of the above prior art products. It is further noted that the product made by following the controlled conditions of the invention is the only one which has a practical, instant cold water solubility.

EXAMPLE VIII

In addition to the solubility tests, the above foam dried 9:1 sugar-gelatin also was incorporated into a typical gelatin dessert formulation to test its functional properties. The proportions used were as follows:

| | Percent |
|---|---|
| Foam dried sugar gelatin | 95.74 |
| Fumaric acid | 1.82 |
| Sodium citrate | 2.28 |
| FD&C Red #2 (Allied Chemical & Dye Corp.) | .07 |
| Cherry flavor (food materials) | .09 |

Twenty-two grams of the above powder were dissolved in 120 cc. of water at 60° F. Solubility was essentially instantaneous and complete and produced a gelled product within ½ hour at refrigerator temperature. The dessert was comparable in gel strength, clarity, eating quality and flavor to commercially available dessert products which require boiling water for their preparation and require considerably more time to reach eating consistency.

EXAMPLE IX

One hundred and fifty grams (150 g.) of a mixture of gelatin and sugar in the ratio of 1:9 were dissolved in 150 cc. of boiling water contained in a 5 qt. mixing bowl until solution was complete. Using a Hobart mixer and a wire whip, the solution was whipped to a foam density of 0.25 g./cc. The resulting stable foam was cast at 20 mils at a temperature of 110° F. on a moving drying surface and dried to moisture of 1.50%. The resulting product was doctored at the relatively high temperature of 150° F. The material had a tendency to fuse at the doctor blade and the resulting product, when tested by the static test at 60° F., showed only partial solubility after 10 minutes.

EXAMPLE X

One hundred and fifty grams (150 g.) of a mixture of gelatin and sugar in the ratio of 1 to 9 were dissolved in 150 cc. of boiling water contained in a 5 qt. mixing bowl until solution was complete. Using a wire whip and a Hobart mixer, the solution was whipped at maximum speed to a relatively greater density of 0.7 g./cc. The resulting foam was cast at 20 mils at 110° F. on a moving drying surface and dried as described previously in Example VII. The product was doctored from the belt and evaluated for cold-water solubility. The solubility was found to be slow and the product dissolved only partially at 60° F. by static method.

EXAMPLE XI

One hundred and fifty grams (150 g.) of a mixture of gelatin and sugar in the ratio of 1 to 9 were dissolved in 150 cc. of boiling water contained in a 5 qt. mixing bowl until solution was complete. Using a Hobart mixer and a wire whip, the solution was whipped to a foam density of 0.25 g./cc. The resulting foam was cast at 20 mils on a moving drying belt with a surface temperature of 160° F. and dried as described previously. This relatively high casting temperature causes a substantial breakdown in the foam producing a film which hampers efficient drying and adversely affects the product. The resulting product doctored with great difficulty and when tested for cold-water solubility by the static test at 60° F. showed only partial solubility after 10 minutes.

A second batch was made in a similar manner and cast on the drying belt at a surface temperature 60° F. The foam began to gel badly at the casting edge making it impossible to produce a uniform continuous layer for practical drying.

The foregoing description, while it presents certain details for clearness of understanding, should not be limited thereby because obvious modifications thereto will be apparent to one skilled in the art.

I claim:

1. A continuous method for preparing a dried gelatin product which is readily dispersible in cold water which comprises dissolving sugar and gelatin in water in a sugar to gelatin ratio of at least 7:1, foaming said solution to a density of between about 0.1 to 0.6 gram/cc., casting said foam as a continuous layer, of a thickness not exceeding about 150 mils and at a temperature not exceeding about 140° F. drying surface, drying said layer, at a temperature not exceeding 180° F. and for a period not exceeding about 5 minutes by applying heat at the underside of said drying surface while passing heated air over and in contact with said layer, and doctoring the dried product from said drying surface at a temperature not in excess of about 130° F.

2. The method of claim 1, wherein the ratio of sugar to gelatin is in the range of about 8:1 to 10:1, the foam density is between about 0.2 gram/cc. and 0.4 gram/cc. and the foam layer is between about 20 mils and 70 mils.

3. The method of claim 1, wherein the ratio of sugar to gelatin is about 9:1, the density is about 0.2–0.3 gram/cc., the casting temperature is about 90° F. to 100° F., the layer thickness is about 20–30 mils, the drying temperature does not exceed about 170° F. and the drying time does not exceed about two minutes.

4. A dried gelatin-sugar product produced by the process of claim 1 substantially instantly and completely cold-water soluble and substantially uncollapsed foam flakes.

5. The product of claim 4 wherein the sugar to gelatin ratio is between about 8:1 to 10:1.

6. The product of claim 4 wherein the sugar to gelatin ratio is about 9:1.

References Cited

UNITED STATES PATENTS

| | | | |
|---|---|---|---|
| 1,993,289 | 3/1935 | Stokes et al. | 99—130 |
| 2,841,498 | 7/1958 | Cahn et al. | 99—130 |
| 3,266,559 | 8/1966 | Osborne et al. | 99—206 |

A. LOUIS MONACELL, *Primary Examiner.*

J. M. HUNTER, *Assistant Examiner.*